US006819763B2

United States Patent
Wen et al.

(10) Patent No.: US 6,819,763 B2
(45) Date of Patent: Nov. 16, 2004

(54) ELECTRONIC ACCESSORY CAPABLE OF SECURELY ATTACHING TO A MOBILE PHONE WITH TWO PAIRS OF HOOKS

(75) Inventors: Ming Wen, Shanghai (CN); Su-Tane Yin, Taipei Hsien (TW)

(73) Assignee: Inventec Appliances Corp., Taipei Hsien (TW)

( * ) Notice: Subject to any disclaimer, the term of this patent is extended or adjusted under 35 U.S.C. 154(b) by 201 days.

(21) Appl. No.: 10/065,586

(22) Filed: Oct. 31, 2002

(65) Prior Publication Data

US 2004/0086111 A1 May 6, 2004

(51) Int. Cl.[7] ................................................ H04M 1/00
(52) U.S. Cl. .................................. 379/438; 379/433.05
(58) Field of Search ........................... 379/433.05, 438; 439/353, 358, 610

(56) References Cited

U.S. PATENT DOCUMENTS 5,797,771 A * 8/1998 Garside ...................... 439/610
6,099,339 A * 8/2000 Yanagida et al. ........... 439/358
6,113,415 A * 9/2000 Bertsch et al. .............. 439/353

* cited by examiner

Primary Examiner—Jack Chiang
(74) Attorney, Agent, or Firm—Winston Hsu

(57) ABSTRACT

An electronic device capable of securely attaching to a mobile phone includes a pair of first hooks and a pair of second hooks. The mobile phone has a first slot located on a bottom side of the mobile phone, and a pair of second slots respectively located on two sides of the mobile phone. The pair of first hooks and the pair of second hooks of the electronic device are capable of respectively inserting into the first slot and the pair of second slot of the mobile phone so as to securely attach the electronic device to the mobile phone.

8 Claims, 2 Drawing Sheets

US 6,819,763 B2

ELECTRONIC ACCESSORY CAPABLE OF SECURELY ATTACHING TO A MOBILE PHONE WITH TWO PAIRS OF HOOKS

BACKGROUND OF INVENTION

1. Field of the Invention

The present invention relates to an electronic accessory, and more particularly, to an electronic accessory capable of securely attaching to a mobile phone with two pairs of hooks.

2. Description of the Prior Art

Due to the explosive progress in communication technologies, mobile phones are becoming increasingly popular. A mobile phone can be equipped with many kinds of electronic accessories, such as a charger or an input/output device, to promote functionalities of the mobile phone. An electronic accessory is usually attached to the mobile phone with its own attachment device (for example, hooks).

Please refer to FIG. 1, which is a schematic diagram showing a prior art electronic accessory 10 attached to a mobile phone 20. The mobile phone 20 comprises a slot 22 located on the bottom side of the mobile phone 20. The slot 22 comprises a plurality of holes 24 installed therein. The electronic accessory 10 comprises a pair of hooks 12 and a pair of elastic arms 16, respectively located on two sides of the electronic accessory 10. The pair of hooks 12 is used to inlay inside two sides of the slot 22 of the mobile phone 20 such that the electronic accessory 10 can be attached to the mobile phone 20. The electronic accessory 10 further comprises a plurality of pins 14 corresponding to the plurality of holes 24. The pins 14 insert into the holes 24 and serve as data channels when the pair of hooks 12 of the electronic accessory 10 is respectively inlayed into the two sides of the slot 22 of the mobile phone 20.

Procedures for attaching the prior art electronic accessory 10 to the mobile phone are described as follows. Align the plurality of pins 14 of the electronic accessory 10 at the corresponding holes 24 of the mobile phone 20 and then insert the pins 14 into the holes 24 until arrow-shaped heads of the hooks 12 are inlayed into the two sides of the slot 22 of the mobile phone 20. Procedures for detaching the prior art electronic accessory 10 from the mobile phone 20 are described as follows. Respectively imposing a force toward an inner side of the electronic accessory 10 on each elastic arm 16 and the pair of hooks 12 will move along with the movements of the elastic arms 16 toward the inner side of the electronic accessory 10 until the arrow-shaped heads (A, A" shown in FIG. 1) of the hooks 12 have respectively moved to B, B", then detaching the electronic accessory 10 from the mobile phone 20.

The prior art electronic accessory 10 attaches to the mobile phone 20 with the slim and easily-broken hooks 12. If the hooks 12 are broken, resulting from carelessness of a user of the mobile phone 20, the plurality of pins 14 of the electronic accessory 10 cannot maintain a good connection with the corresponding holes 24 of the mobile phone 20.

SUMMARY OF INVENTION

It is therefore a primary objective of the claimed invention to provide an electronic accessory capable of securely attaching to a mobile phone.

According to the claimed invention, the mobile phone has a first slot located on a bottom side of the mobile phone and a pair of second slots respectively located on two sides of the mobile phone. The electronic accessory comprises a housing, a pair of first hooks, and a pair of second hooks.

The pair of first hooks is installed inside the housing for attaching the electronic accessory to the mobile phone. Each first hook comprises an inlaying end and an imposing end. When the electronic accessory is attached to the mobile phone, the pair of inlaying ends of the pair of first hooks is respectively inlayed into two sides of the first slot of the mobile phone. When forces toward an inner side of the housing are imposed on the pair of imposing ends, the pair of imposing ends and the pair of inlaying ends synchronically move toward the inner side of the housing. When the pair of imposing ends move toward the inner side of the housing by a predetermined distance due to the forces imposed on the pair of imposing ends, the pair of inlaying ends and the pair of imposing ends synchronically move toward the inner side of the housing such that the electronic accessory can be detached from the mobile phone.

The pair of second hooks is installed inside the housing for attaching the electronic accessory to the mobile phone. Each second hook comprises an inlaying end, an imposing end, and a pivot located between the inlaying end and the imposing end and rotatably fastened to the housing. When the pair of inlaying ends of the pair of first hooks of the electronic accessory is inlayed into the two sides of the first slot of the mobile phone, the pair of inlaying ends of the pair of second hooks of the electronic accessory is synchronically inlayed into the pair of second slots of the mobile phone. When the pair of imposing ends of the pair of second hooks of the electronic accessory is imposed upon by two forces to move toward the inner side of the housing by the predetermined distance, the pair of inlaying ends of the second hooks of the electronic accessory synchronically move toward a direction opposite from the inner side of the housing by the determined distance to synchronically detach the pair of inlaying ends of the second hooks from the pair of second slots and the pair of inlaying ends of the pair of first hooks from the first slot of the mobile phone.

It is an advantage of the claimed invention that the electronic accessory uses two pairs of hooks, not just one pair of hooks, to attach more securely to the mobile phone.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
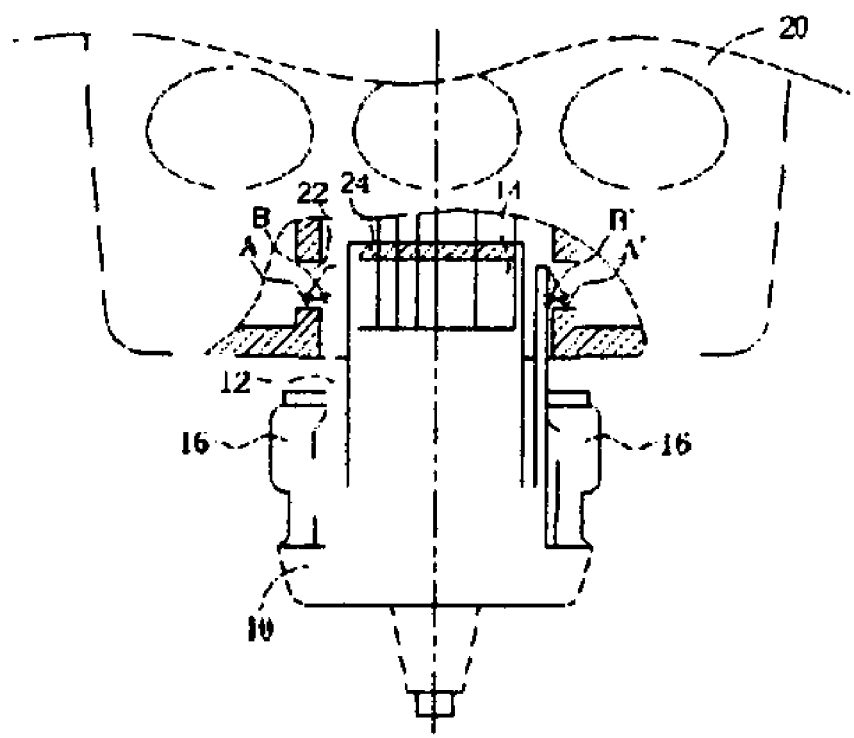
FIG. 1 is a schematic diagram showing a prior art electronic accessory attached to a mobile phone.
Figure 2:
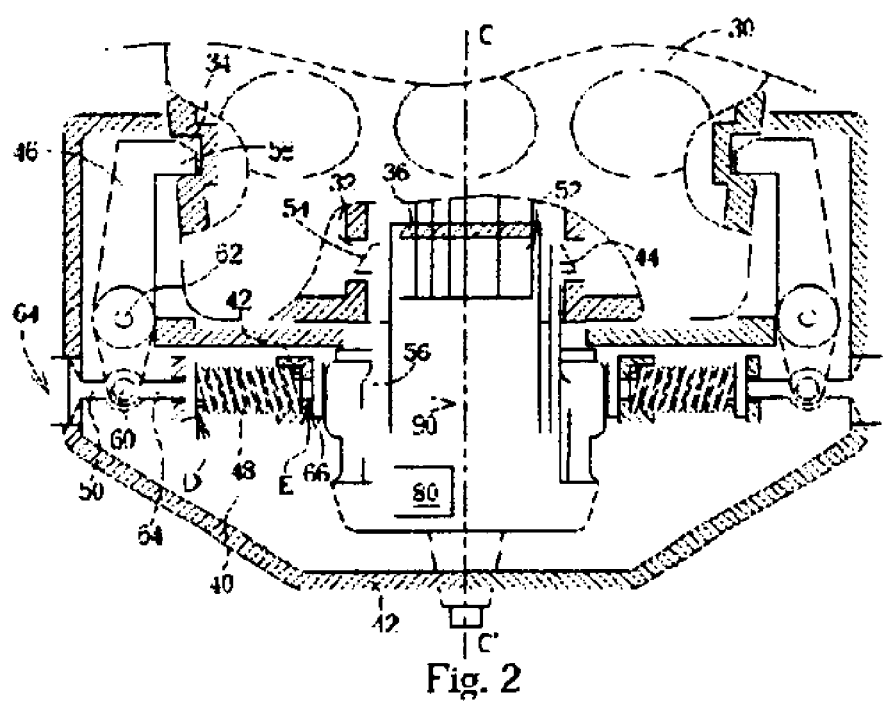
FIG. 2 is a schematic diagram showing an electronic accessory attached to a mobile phone according to the present invention.

Please refer to FIG. 2, which shows an electronic accessory 40 attached to a mobile phone 30 according to the present invention. The mobile phone 30 comprises a first slot 32 located on a bottom side of the mobile phone 30, a pair of second slots 34 respectively located on two sides of the mobile phone 30, and a plurality of holes 36. The electronic accessory 40 comprises a housing 42 (shown as hashed lines in FIG. 2), a pair of first hooks 44 installed inside the housing 42 for attaching the electronic accessory 40 to the mobile phone 30, a pair of second hooks 46 installed inside the housing 42 for attaching the electronic accessory 40 to the mobile phone 30, a pair of elastic materials 48, such as springs, a pair of control poles 50, a plurality of pins 52 corresponding to the plurality of holes 36 of the electronic accessory 40, and related circuits 80. When the electronic accessory 40 is attached to the mobile phone 30, the pins 52 and the corresponding holes 36 are mated and serve as data channels between the electronic accessory 40 and the mobile phone 30. The related circuits 80 of the electronic accessory 40 are related to the functionality of the electronic accessory 40. For example, if the electronic accessory 40 is a charger, the related circuits 80 comprise transformers, and if the electronic accessory 40 is a keypad, the related circuits 80 comprise input/output circuits.

Because the attaching-related devices of the electronic accessory 40 for attaching the electronic accessory 40 to the mobile phone 30, such as the first hooks 44 and control poles 50 etc, are all located symmetrical to a center line C–C" of the electronic accessory 40, only the attaching-related devices located on the left-hand side of the center line C–C" are described in following paragraphs. Configurations and operations of the attaching-related devices located on the right-hand side of the center line C–C" are identical to those of the attaching-related devices located on the left-hand side of the center line C–C". Moreover, when the electronic accessory 40 is attached to the mobile phone 30, the plurality of pins 52 of the electronic accessory 40 are inserted into the plurality of holes 36 of the mobile phone 30 in a one-to-one correspondence. When the electronic accessory 40 is detached from the mobile phone 30, the pins 52 are also, of course, detached from the holes 36.

The first hook 44 of the electronic accessory 40 comprises an inlaying end 54 and an imposing end 56. The inlaying end 54, shown in FIG. 2, of the first hook 54 is arrow-shaped to guarantee that the inlaying end 54 of the first hook 44 will not separate from the first slot 32 of the mobile phone 30 after the inlaying end 54 has been inlayed into the first slot 32 of the mobile 30 and the electronic accessory 40 has been attached to the mobile phone 30. When the electronic accessory 40 is attached to the mobile phone 30, the inlaying end 54 of the first hook 44 of the electronic accessory 40 is inlayed into the first slot 32 of the mobile phone 30. When the imposing end 56 of the first hook 44 is applied by a force toward the inner side (in the direction indicated by an arrow 90) of the housing 42 of the electronic accessory 40, the inlaying end 54 synchronically moves toward the inner side of the housing 42. When the imposing end 56 has moved toward the inner side of the housing 42 by a predetermined distance due to the force, the inlaying end 54 of the first hook 44 synchronically moves along with the imposing end 56 toward the inner side of the housing 42 and thus the electronic accessory 40 can be detached from the mobile phone 30. In the preferred embodiment of the present invention, the electronic accessory 40 is a charger and the predetermined distance is approximately 0.6 mm.

The second hook 46 of the electronic accessory 40 comprises an inlaying end 58, an imposing end 60, and a pivot 62 rotatably fixed to the housing 42 and located between the inlaying end 58 and the imposing end 60. When the inlaying end 54 of the first hook 44 of the electronic accessory 40 is inlayed into the first slot 32 of the mobile phone 30, the inlaying end 58 of the second hook 46 of the electronic accessory 40 is synchronically inlayed into the second slot 34 (located on the left-hand side of the center line C—C) of the mobile phone 30. When the imposing end 60 of the second hook 46 of the electronic accessory 40 is imposed by a force to move toward the inner side of the housing 42 by the predetermined distance, the imposing end 60, having moved toward the inner side of the housing 42 by the predetermined distance, synchronically drives the control pole 50 to move toward the inner side of the housing 42 by the predetermined distance. Similarly, the driven control pole 50 also drives the imposing end 56 of the first hook 44 to move toward the inner side of the housing 42 by the predetermined distance (why the control pole 50 moves along with the movement of the imposing end 60 of the second hook 46 will be explained in the following paragraph). The inlaying end 58 of the second hook 46 of the electronic accessory 40 moves synchronically toward the direction opposite from the inner side of the housing 42 due to the lever principle to detach from the second slot 34 of the mobile phone 30. That is, the inlaying end 58 of the second hook 46 and the inlaying end 54 of the first hook 44 are synchronically respectively detached from the second slot 34 and the first slot 32 of the mobile phone 30.

The control pole 50 of the electronic accessory 40 comprises a first end 64 contacted to the imposing end 60 of the second hook 46 of the electronic accessory 40, and a second end 66 contacted to the imposing end 56 of the first hook 44 of the electronic accessory 40. When the first end 64 of the control pole 50 is applied a force to move toward the inner side of the housing 42 by the predetermined distance, the imposing end 60 of the second hook 46 is driven toward the inner side of the housing 42 by the predetermined distance causing the second hook 46 to rotate around the pivot 62, detaching the inlaying end 58 of the second hook 46 from the second slot 34. Simultaneously, the movement of the second end 66 of the control pole 50 drives the imposing end 56 of the first hook 44 of the electronic accessory 40 to move toward the inner side of the housing 42 by the predetermined distance, detaching the inlaying end 54 from the first slot 32.

The elastic material 48 (a spring) of the electronic accessory 40 is mounted onto the control pole 50. One end of the elastic material 48 is located against the contact pole 50 at node D, shown in FIG. 2, while the other end of the elastic material 48 is located against to the housing 42 at node E. When the imposing end 56 of the second hook 46 of the electronic accessory 40 is imposed upon by a force to move toward the inner side of the housing 42 by the predetermined distance, the elastic material 48 is synchronically compressed by the control pole 50. When the imposing end 56 of the second hook 46 of the electronic accessory 40 is freed from the force, the elastic material 48 rebounds the control pole 50 toward the opposite direction from the inner side of the housing 42 by the predetermined distance.

Please note that the first hook 44 is made of a kind of elastic materials. That is, when a force is applied to the imposing end 56 of the first hook 44, the inlaying end 54 of the first hook 44 of the electronic accessory 40 synchronically moves toward the inner side of the housing 42 by the predetermined distance. If the force is not applied to the imposing end 56 of the first hook 44, the inlaying end 54 of the first hook 44 will rebound toward the direction opposite from the inner side of the housing 42 by the predetermined distance.

In contrast to the prior art electronic accessory 10 having only one pair of hooks, the present invention electronic accessory 40 comprises not only a pair of first hooks 44 but a pair of second hooks 46, so the electronic accessory 40 can attach to the mobile phone 30 more securely than can the prior art electronic accessory 10. Additionally, the lever principle is employed for the attachment/detachment of the electronic accessory 40 and the mobile phone 30. When the imposing end 60 of the second hook 46 of the electronic accessory 40 receives a force, the imposing end 60 of the second hook 46 and the imposing end 56 of the first hook 44 synchronically move toward the inner side of the housing 42 by the predetermined distance, and the inlaying end 58 of the second hook 46 and the inlaying end 54 of the first hook 44 synchronically move in two opposite directions such that the electronic accessory 40 can detach from the mobile phone 30. Such a design of the pairs of hooks of the electronic accessory 40 makes the electronic accessory 40 be capable of securely attaching to the mobile phone 30.

Following the detailed description of the present invention above, those skilled in the art will readily observe that numerous modifications and alterations of the device may be made while retaining the teachings of the invention. Accordingly, the above disclosure should be construed as limited only by the metes and bounds of the appended claims.

What is claimed is:

1. An electronic accessory capable of attaching to a mobile phone, the mobile phone having a first slot located on a bottom side of the mobile phone and a pair of second slots respectively located on two sides of the mobile phone, the electronic accessory comprising:

a housing;

a pair of first hooks installed inside the housing for attaching the electronic accessory to the mobile phone, each first hook comprising an inlaying end and an imposing end; wherein when the electronic accessory is attached to the mobile phone the pair of inlaying ends of the pair of first hooks are respectively inlayed into two sides of the first slot of the mobile phone, when the pair of imposing ends are imposed by forces toward an inner side of the housing the pair of imposing ends and the pair of inlaying ends synchronically move toward the inner side of the housing, and when the pair of imposing ends move toward the inner side of the housing by a predetermined distance due to the forces respectively imposed on the pair of imposing ends, the pair of inlaying ends and the pair of imposing ends synchronically move toward the inner side of the housing such that the electronic accessory can be detached from the mobile phone; and a pair of second hooks installed inside the housing for attaching the electronic accessory to the mobile phone, each second hook comprising an inlaying end, an imposing end, and a pivot located between the inlaying end and the imposing end and rotatably fastened to the housing;

wherein when the pair of inlaying ends of the pair of first hooks of the electronic accessory are respectively inlayed into the two sides of the first slot of the mobile phone, the pair of inlaying ends of the pair of second hooks of the electronic accessory are synchronically inlayed into the pair of second slots of the mobile phone; when the pair of imposing ends of the pair of second hooks of the electronic accessory are imposed by two forces to move toward the inner side of the housing by the predetermined distance, the pair of inlaying ends of the second hooks of the electronic accessory synchronically respectively move toward an opposite direction from the inner side of the housing by the determined distance to synchronically respectively detach the pair of inlaying ends of the second hooks from the pair of second slots and the pair of inlaying ends of the pair of first hooks from the first slot of the mobile phone.

2. The electronic accessory of claim 1 further comprising a pair of control poles having a pair of first ends respectively contacting the imposing end of the pair of second hooks of the electronic accessory and a pair of second ends respectively contacting the imposing end of the pair of first hooks of the electronic accessory, wherein when the pair of imposing ends of the pair of second hooks of the electronic accessory are imposed by the forces to move toward the inner side of the housing by the predetermined distance, the pair of control poles synchronically move along with the imposing ends of the second hooks toward the inner side of the housing by the predetermined distance and the pair of control poles synchronically respectively drive the pair of imposing ends of the pair of first hooks to move toward the inner side of the housing by the predetermined distance.

3. The electronic accessory of claim 2 further comprising a pair of elastic materials respectively mounted upon the pair of control poles, one end of each of the pair of elastic materials respectively contacting only one of the pair of control poles in a one-to-one correspondence and the other ends of the pair of elastic materials contacting the housing, wherein when the pair of imposing ends of the pair of second hooks of the electronic accessory are moved by the forces toward the inner side of the housing by the predetermined distance, the pair of elastic materials are synchronically respectively compressed by the pair of control poles, and when the pair of imposing ends of the pair of second hooks of the electronic accessory are free from the forces, the pair of elastic materials respectively drive the pair of control poles toward the opposite direction from the inner side of the housing by the predetermined distance.

4. The electronic accessory of claim 3 wherein the pair of elastic materials are a pair of springs.

5. The electronic accessory of claim 1 wherein the pair of first hooks of the electronic accessory is made of elastic material, wherein when the pair of imposing ends of the first hooks of the electronic accessory are imposed by the forces, the pair of inlaying ends of the pair of the first hooks of the electronic accessory will move toward the inner side of the housing by the predetermined distance, and when the pair of imposing ends of the first hooks of the electronic accessory is free from the forces, the pair of inlaying ends of the pair of the first hooks of the electronic accessory will rebound toward the opposite direction from the inner side of the housing by the predetermined distance.

6. The electronic accessory of claim 1 is a charger.

7. The electronic accessory of claim 1 is an input/output device.

8. The electronic accessory of claim 6 wherein the predetermined distance is approximately 0.6 mm.

* * * * *